United States Patent
Kris et al.

(10) Patent No.: US 8,363,435 B2
(45) Date of Patent: Jan. 29, 2013

(54) DIGITAL DEVICE WITH BOOT STRAP CIRCUIT STIMULATOR

(75) Inventors: Bryan Kris, Gilbert, AZ (US); Sagar Khare, Chandler, AZ (US); Mohammad Kamil, Bangalore (IN)

(73) Assignee: Microchip Technology Incorporated, Chandler, AZ (US)

( * ) Notice: Subject to any disclaimer, the term of this patent is extended or adjusted under 35 U.S.C. 154(b) by 390 days.

(21) Appl. No.: 12/722,602

(22) Filed: Mar. 12, 2010

(65) Prior Publication Data

US 2011/0222322 A1  Sep. 15, 2011

(51) Int. Cl.
*H02M 1/00* (2007.01)
*H02M 3/335* (2006.01)

(52) U.S. Cl. ... 363/49; 363/21.05; 363/21.1; 363/21.13; 363/21.18

(58) Field of Classification Search ............... 363/49, 363/21.02, 21.05, 21.08–21.13, 21.16–21.18; 323/901

See application file for complete search history.

(56) References Cited

U.S. PATENT DOCUMENTS

| | | | |
|---|---|---|---|
| 5,459,652 A | 10/1995 | Faulk | 363/49 |
| 5,767,631 A | 6/1998 | Konopka et al. | 315/307 |
| 6,208,534 B1 * | 3/2001 | Shteynberg et al. | 363/21.04 |
| 7,221,128 B2 * | 5/2007 | Usui et al. | 323/207 |
| 2006/0221650 A1 * | 10/2006 | Yamada | 363/21.01 |
| 2008/0276115 A1 * | 11/2008 | Phoenix et al. | 713/501 |
| 2008/0298095 A1 * | 12/2008 | Chuang et al. | 363/21.12 |
| 2009/0147547 A1 * | 6/2009 | Yamashita | 363/21.16 |
| 2009/0231886 A1 | 9/2009 | Xia et al. | 363/20 |
| 2011/0019446 A1 * | 1/2011 | Wu et al. | 363/79 |

OTHER PUBLICATIONS

International PCT Search Report, PCT/US2011/027920, 3 pages, Mailed Mar. 16, 2012.

* cited by examiner

*Primary Examiner* — Adolf Berhane
*Assistant Examiner* — Emily Pham
(74) *Attorney, Agent, or Firm* — King & Spalding L.L.P.

(57) ABSTRACT

A digital device generates a fixed duty cycle signal with an internal oscillator after a Power-On-Reset (POR). This fixed duty cycle signal is output on a signal pin that normally is used for a PWM control signal. The fixed duty cycle signal is used to stimulate the voltage generation circuits so as to power up the digital device for initialization thereof. Once the digital device has powered-up and initialized, the digital device switches over to normal operation for control of the power system.

23 Claims, 4 Drawing Sheets

DIGITAL DEVICE WITH BOOT STRAP CIRCUIT STIMULATOR

TECHNICAL FIELD

The present disclosure relates to digital devices for controlling electrical power applications, and more particularly, to powering-up a digital device before initiating control of the electrical power application with the digital device.

BACKGROUND

Digital devices are used in power applications to control power supplies, drive fluorescent lamps and control light brightness thereof, brushless direct current motor speed and direction, etc. However before commencement of controlling the power application with the digital device, the digital device must be powered up and initialized into a stable operating state. Present technology control devices generally have been powered up with a boot-strap power supply, also known as a bias supply. The boot-strap power supply traditionally has been implemented with discrete components or function specific analog circuits external to the digital device. For example, in order to digitally control a power supply application a power source must provide stable power to the digital device before actual control and operation of the power supply takes place. This requires many additional external components to build a boot-strap or bias power supply just for powering up and initializing the digital device before it can assume control of the power application.

SUMMARY

The aforementioned problem is solved, and other and further benefits achieved by generating a fixed duty cycle signal from a digital device with an internal oscillator after a Power-On-Reset (POR) to the digital device. This fixed duty cycle signal is output on a signal pin that normally is used for a PWM control signal. The fixed duty cycle signal is used to stimulate the voltage generation circuits of power application so that power can be obtained from the power generation circuit to power up the digital device so that normal operation may commence. Once the digital device has powered-up and initialized, the digital device switches over to normal operation and control of the power application.

According to a specific example embodiment of this disclosure, a power system having a boot strap stimulator for startup thereof comprises: a power inductor having a power coil and an auxiliary coil; a power transistor connected to the power coil, and the power coil and power transistor are connected to a direct current power source, wherein when the power transistor switches on and off a varying magnetic flux is created in the power inductor that causes alternating current voltages to be generated in the power coil and the auxiliary coil; a transistor driver connected to and controlling the power transistor; a digital device having an output connected to the transistor driver for control thereof; a low dropout voltage regulator supplying power to the digital device; a startup power circuit coupled to the direct current power source, the startup power circuit supplying a startup voltage to the low dropout voltage regulator and the transistor driver; and a power rectifier coupled to the auxiliary coil, wherein the power rectifier supplies an operating voltage to the low dropout voltage regulator and the transistor driver; wherein the output of the digital device supplies a control signal at a constant frequency when the startup power circuit is supplying the startup voltage and a pulse width modulation (PWM) control signal when the power rectifier is supplying the operating voltage.

According to another specific example embodiment of this disclosure, a power system having a boot strap stimulator for startup thereof comprises: a power inductor having a power coil and an auxiliary coil having first and second output voltages, wherein the first output voltage is greater than the second output voltage; a power transistor connected to the power coil, and the power coil and power transistor are connected to a direct current power source, wherein when the power transistor switches on and off a varying magnetic flux is created in the power inductor that causes alternating current voltages to be generated in the power coil and the tapped auxiliary coil; a transistor driver connected to and controlling the power transistor; a digital device having an output connected to the transistor driver for control thereof; a low dropout voltage regulator supplying power to the digital device; a startup power circuit coupled to the direct current power source, the startup power circuit supplying a startup voltage to the low dropout voltage regulator and the transistor driver; and a first power rectifier connected to the auxiliary coil first voltage, wherein the first power rectifier supplies a first operating voltage to the transistor driver; and a second power rectifier connected to the auxiliary coil second voltage, wherein the second power rectifier supplies a second operating voltage to the low dropout voltage regulator; wherein the output of the digital device supplies a control signal at a constant frequency when the startup power circuit is supplying the startup voltage and a pulse width modulation (PWM) control signal when the first and second power rectifiers are supplying the first and second operating voltages, respectively.

BRIEF DESCRIPTION OF THE DRAWINGS

A more complete understanding of the present disclosure thereof may be acquired by referring to the following description taken in conjunction with the accompanying drawings wherein.

Figure 1:
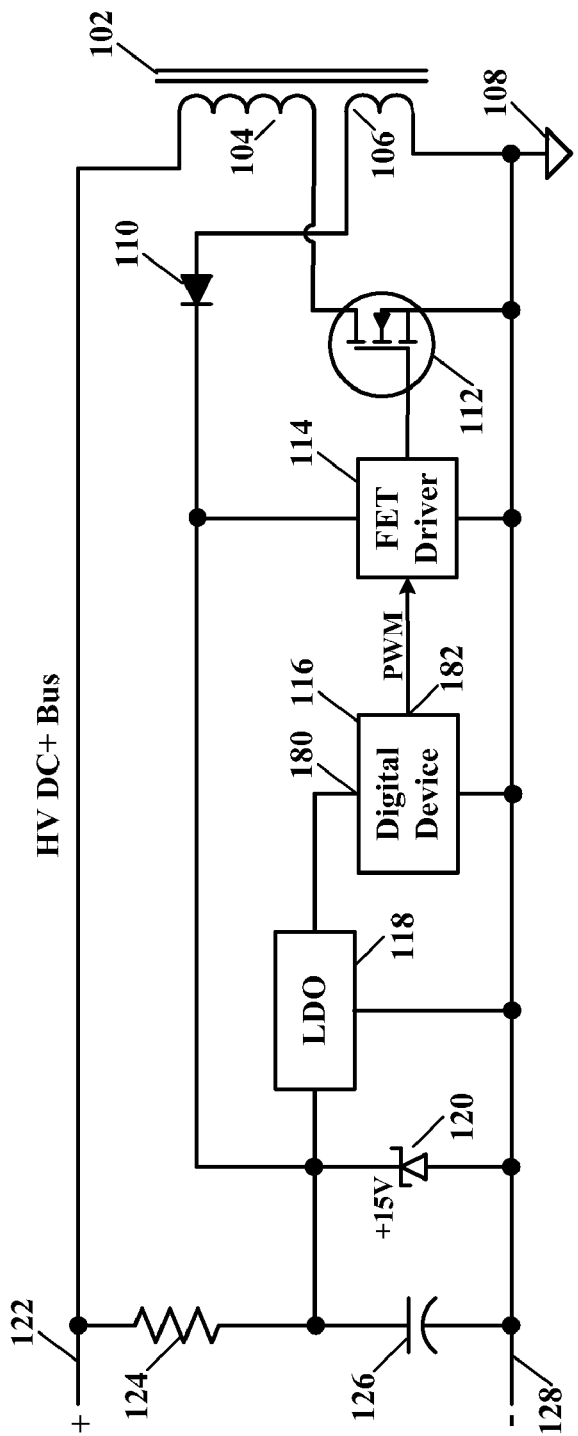
FIG. 1 illustrates a schematic diagram of a power application controlled by a digital device, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

Referring to FIG. 1, depicted is a schematic diagram of a power application controlled by a digital device, according to a specific example embodiment of this disclosure. The power application may be, for example but not limited to, a power supply, a fluorescent lamp driver (full brightness and dimming brightness control), brushless direct current motor speed and direction control, etc. When high voltage power is applied at power nodes 122 (+VDC) and 128 (−VDC), voltage across capacitor 126 rises according to the time constant of resistor 124 and capacitor 126 until reaching the breakdown voltage (e.g., 15 VDC) of the zener diode 120. The DC voltage from the resistor 124 that charges the capacitor 126 is used as a low current bias voltage, Vbias, and is applied to a low dropout (LDO) voltage regulator 118 and a transistor driver 114, e.g., field effect transistor (FET). The LDO voltage regulator 118 supplies an appropriate voltage to the digital device 116 during both start-up/stabilization thereof and normal operation, as more fully described hereinbelow. The digital device 116 may be for example but is not limited to a microprocessor, a digital signal processor (DSP), an application specific integrated circuit (ASIC), a programmable logic array (PLA), and a field-programmable gate array (FPGA), etc.

The digital device 116 supplies a drive signal, e.g., a pulse width modulation (PWM) signal from node 182 to the FET transistor driver 114, that controls the power transistor 112, e.g., a power FET. The power FET 112 turns on and off based upon control from the transistor driver 114, and causes an inductively induced alternating current (AC) voltage to build up and be generated in a power inductor 102. The power inductor 102 may comprise a power coil 104 and an auxiliary coil 106. The power inductor 102 may be part of a switching power supply, a fluorescent lamp driver with or without light brightness control, or stator coils (only one shown for clarity) of a brushless direct current motor. The power coil 104 (e.g., a winding on a magnetic core) of the inductor 102 in combination with the power FET 112 switching on and off, creates a magnetic flux that induces an AC voltage across the auxiliary coil 106 (e.g., another winding on the magnetic core). The AC voltage from the auxiliary coil 106 is rectified with a diode 110 to produce a pulsating DC voltage that is smoothed with the capacitor 126. The rectified voltage from the diode 110 provides power to the transistor driver 114 and the digital device 116 through the LDO regulator 118 during both start-up and normal operation of the power circuit of FIG. 1. However, before the power FET 112 can begin switching on and off, the digital device 116 must supply a control signal to the transistor driver 114 that in turn controls the on and off switching operation of the power FET 112. However, before the power FET 112 begins switching on and off, the low current bias voltage from the resistor 124 is used by the digital device 116 to initialize proper operation thereof and to supply an independent PWM signal for controlling the transistor driver 114 during start-up of the power application and so as to initiate switching operations of the power FET 112. Once the digital device 116 has been properly initialized and is ready for normal operation, this independent PWM signal is replace by the PWM control signal used during normal operation of the circuit for the power application.

Figure 2:
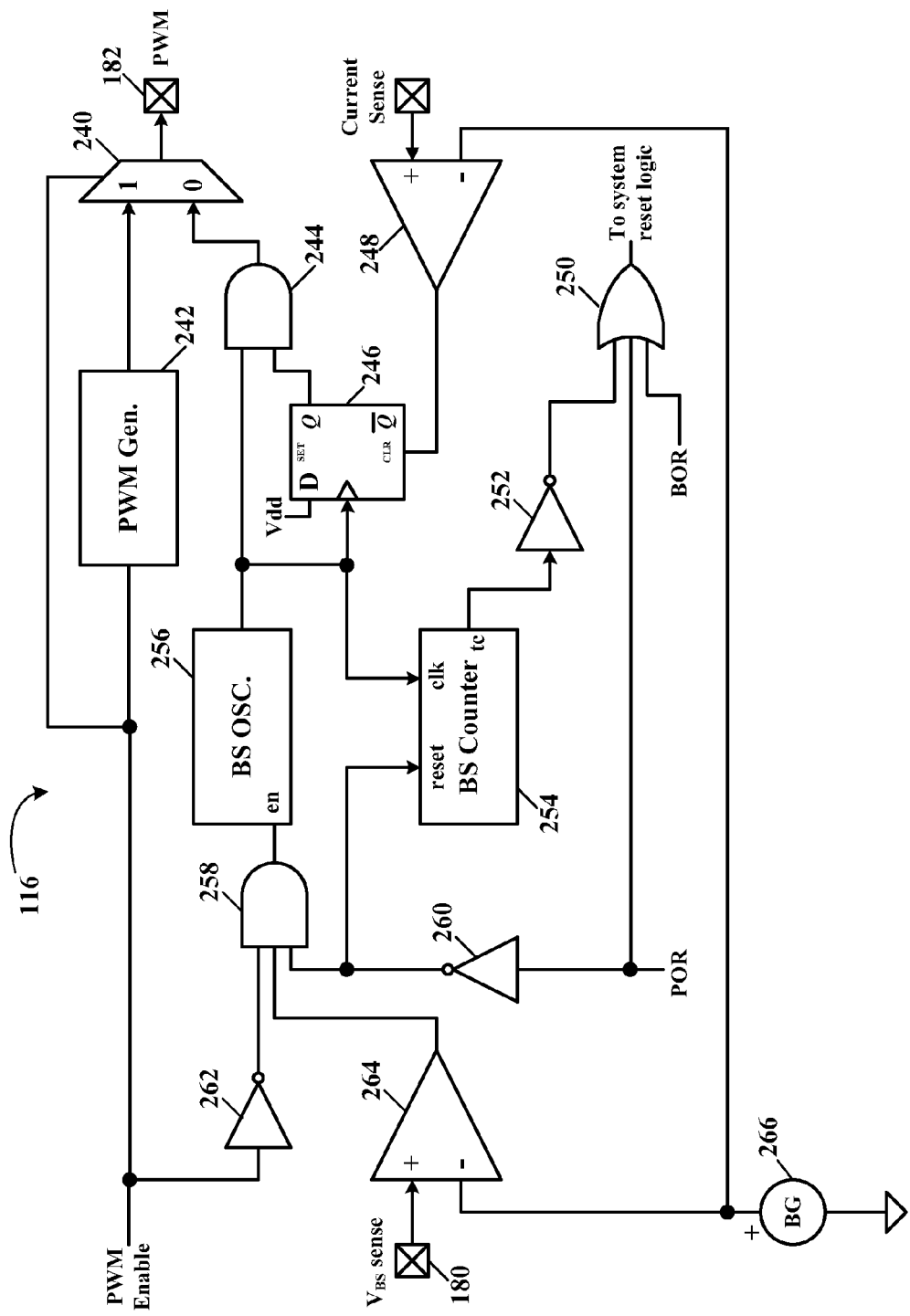
FIG. 2 illustrates a more detailed schematic diagram of the digital device of FIG. 1.

Referring now to FIG. 2, depicted is a more detailed schematic diagram of the digital device of FIG. 1. The digital device 116 may comprise a PWM generator 242 having an output connected to one input of a multiplexer 240, a bootstrap oscillator 256, a flip-flop 246, a bootstrap counter 254, a current sense comparator 248, a voltage sense comparator 264, a voltage reference 266, e.g., bandgap voltage reference; and gate logic, e.g., AND gates 244 and 258, OR gate 250 and inverters 252, 260 and 262. The bootstrap oscillator 256 provides a control signal, e.g., PWM, for driving the transistor driver 114. An output of the multiplexer 240 is connected to an external node 182 of the digital device 116 and supplies the PWM control signal for the transistor driver 114 (FIG. 1). Voltage for operation of the digital device 116 is supplied to another external node 180 of the digital device 116. A power-on-reset (POR) is initially asserted at a logic high and places the entire digital device 116 into a reset state (e.g., through OR gate 250 to system reset logic), including the bootstrap counter 254. A bandgap voltage reference 266 may be, for example but is not limited to, about 200 millivolts.

The bootstrap oscillator 256 is enabled when the $V_{BS}$ sense voltage at node 180 is sufficient for proper operation of the digital device 116 (as determined by the voltage sense comparator 264), the PWM enable is at a logic low and power-on-reset (POR) has been deasserted (at logic low). The bootstrap oscillator 256 may run at a fixed frequency, e.g., 100 to 200 kHz, free running when enabled, resistor-capacitor (RC) oscillator. The output from the bootstrap oscillator 256 passes through AND gate 244 to an input of the multiplexer 240. When the PWM enable is at a logic low, the multiplexer 240 couples the PWM signal from AND gate 244 to the PWM output node 182 which controls the transistor driver 114.

The flip-flop 246 will cause the AND gate 244 to cut off the output from the bootstrap oscillator 256 if a current level exceeds an acceptable limit under start-up conditions. This current limit is monitored by the current sense comparator 248 which holds the flip-flop 246 in clear (Q-output at logic low) when the current limit for this start-up configuration is exceeded.

The bootstrap oscillator 256 continues to run, supplying a PWM control signal to the transistor driver 114 until the bootstrap counter 254 "times out" and asserts a logic high at an input of the OR gate 252. The bootstrap counter 254 counts until a sufficient number of PWM pulses are sent to the power generation circuits comprising the transistor driver 114, power FET 112 and inductor 102. Once the bootstrap counter 254 counts up to the "time out," and the POR and "brown-out on reset" (BOR) signals are deasserted (logic low) the digital device 116 and any other power application circuits are enables and all circuits go into normal operation, e.g., the PWM enable is set to a logic high by the digital device 116, and the PWM generator 242 now controls operation of the transistor driver 114. During normal operation of the digital device 116 the bootstrap oscillator 256 is disabled by the output from the AND gate 258 being at a logic low. It is contemplated and within the scope of this disclosure that other logic circuit designs may be equally effective and would be readily understood by one having ordinary skill in the design of digital circuits and the benefit of this disclosure.

Figure 3:
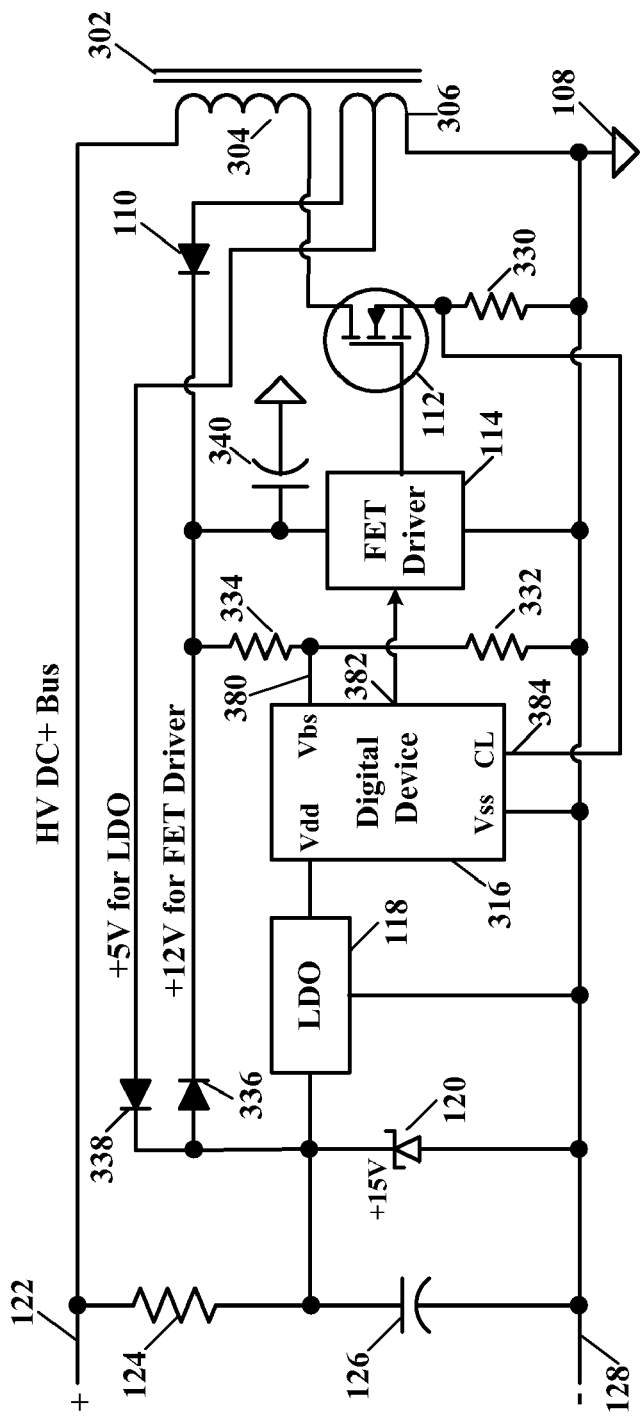
FIG. 3 illustrates a schematic diagram of a power application controlled by a digital device, according to another specific example embodiment of this disclosure.

Referring to FIG. 3, depicted is a schematic diagram of a power application controlled by a digital device, according to another specific example embodiment of this disclosure. The power application may be, for example but not limited to, a power supply, a fluorescent lamp driver (full brightness and dimming brightness control), brushless direct current motor speed and direction control, etc. When high voltage power is applied at power nodes 122 (+VDC) and 128 (−VDC), voltage across capacitor 126 rises according to the time constant of resistor 124 and capacitor 126 until reaching the breakdown voltage (e.g., 15 VDC) of the zener diode 120. The DC voltage from the resistor 124 that charges the capacitor 126 is used as a low current bias voltage, Vbias, and is applied to a low dropout (LDO) voltage regulator 118 and through diode 336 to a transistor driver 114, e.g., field effect transistor (FET). The LDO voltage regulator 118 supplies an appropriate voltage to the digital device 116 during both start-up/stabilization thereof and normal operation, as more fully described hereinbelow. Voltages provided from the resistor 124 and through the diode 336 have just enough current sourcing capacity to startup the digital device and supply enough voltage to the transistor driver so as to start the power FET 112 switching on and off to generate inductively induced voltages on the coil(s) 306. The digital device 316 may be for example but is not limited to a microprocessor, a digital signal processor (DSP), an application specific integrated circuit (ASIC), a programmable logic array (PLA), and a field-programmable gate array (FPGA), etc.

The digital device 316 supplies a drive signal, e.g., a pulse width modulation (PWM) signal from node 382 to the FET transistor driver 114, that controls the power transistor 112, e.g., a power FET. The power FET 112 turns on and off based upon control from the transistor driver 114, and causes an inductively induced alternating current (AC) voltage to build up and be generated in a power inductor 302. The power inductor 302 may comprise a power coil 304 and an auxiliary coil 306. The inductor 302 may be part of a switching power supply, a fluorescent lamp driver with or without light brightness control, or stator coils (only one shown for clarity) of a brushless direct current motor. The power coil 304 (e.g., a winding on a magnetic core) of the inductor 302 in combination with the power FET 112 switching on and off, creates a magnetic flux that induces an AC voltage across the auxiliary coil(s) 306 (e.g., one tapped winding or two separate windings on the magnetic core).

Initially, voltage is supplied to the transistor driver 114 through resistor 124 and diode 336. Then once AC voltage is available from the auxiliary coil 306, the diode 110 rectifies the AC voltage to produce a DC voltage for powering the transistor driver 114 during later startup and normal operation. A tap on the auxiliary coil 306 or separate coil generates a lower AC voltage that may be rectified by diode 338 into a DC voltage applied to the LDO regulator 118 for powering the digital device 316 during both startup and normal operation of the power circuit of FIG. 3.

However, before the power FET 112 can begin switching on and off, the digital device 316 must supply a control signal to the transistor driver 114 that in turn controls the on and off switching operation of the power FET 112. The low current bias voltage from the resistor 124 is used by the digital device 316 to initialize proper operation thereof and to supply an independent PWM signal for controlling the transistor driver 114 during initial start-up of the power application. Once the digital device 116 has been properly initialized and is ready for normal operation, this independent PWM signal is replace by the PWM control signal used during normal operation of the circuit for the power application at output node 382. An external voltage divider comprising resistors 332 and 334 may be used to provide voltage sampling of Vbias at external node 380.

Figure 4:
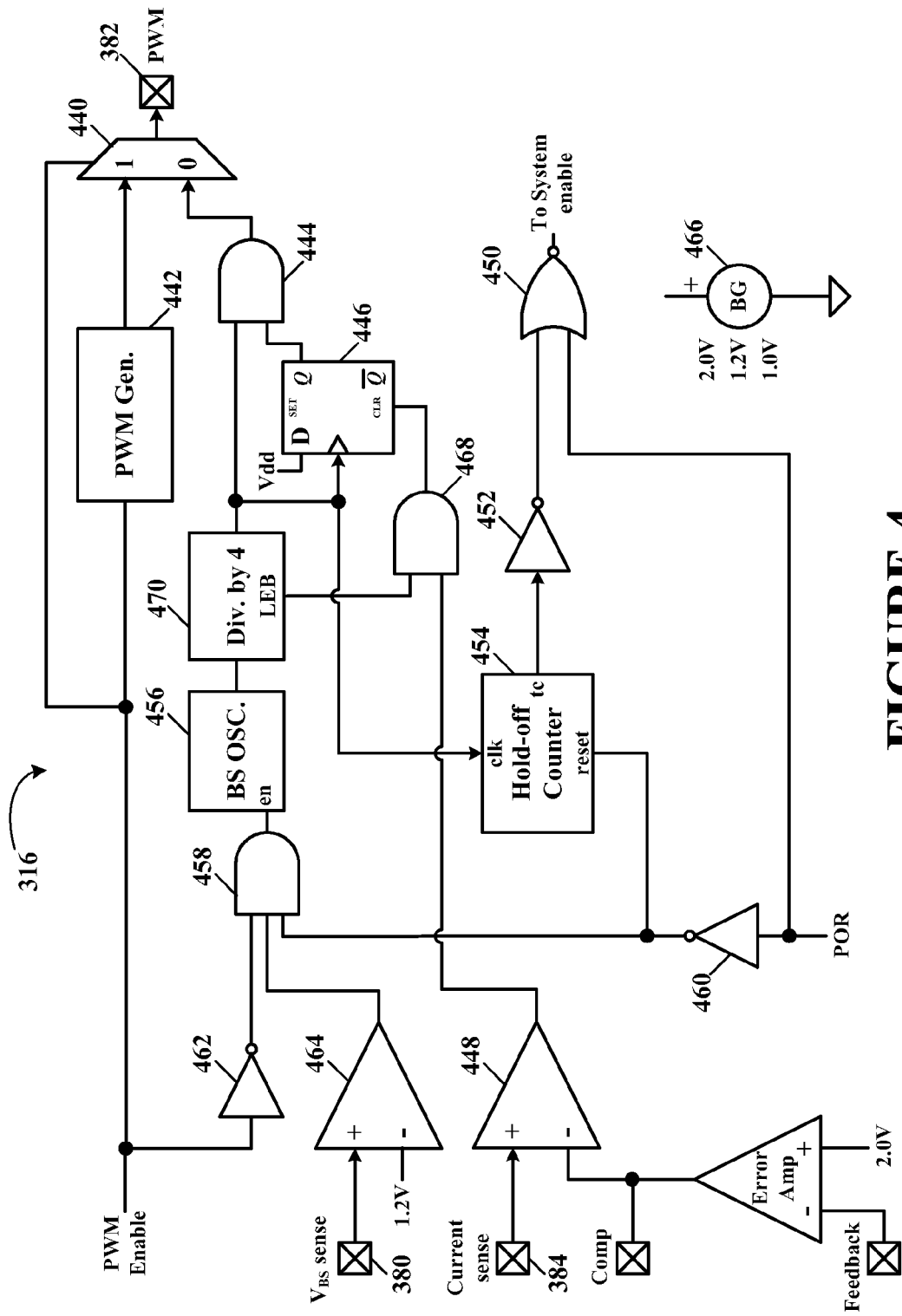
FIG. 4 illustrates a more detailed schematic diagram of the digital device of FIG. 3.

Referring to FIG. 4, depicted is a more detailed schematic diagram of the digital device of FIG. 3. The digital device 316 may comprise a PWM generator 442 having an output connected to one input of a multiplexer 440, a bootstrap oscillator 456, a divide by four frequency divider 470, a flip-flop 446, a hold-off counter 454, a current sense comparator 448, a voltage sense comparator 464, a voltage reference 466, e.g., bandgap voltage reference having a plurality of reference voltages; and gate logic, e.g., AND gates 444, 458 and 468, OR gate 450 and inverters 452, 460 and 462. The bootstrap oscillator 456 provides a control signal, e.g., PWM, for driving the transistor driver 114. An output of the multiplexer 440 is connected to an external node 382 of the digital device 316 and supplies the PWM control signal for the transistor driver 114 (FIG. 3). Voltage for operation of the digital device 316 is supplied to a Vdd node and is monitored at the external node 380 of the digital device 316. A power-on-reset (POR) is initially asserted at a logic high and places the entire digital device 316 into a reset state (e.g., through OR gate 450 to system enable logic—not shown), including the hold-off counter 454. A bandgap voltage reference 466 may have multiple reference voltages, for example but are not limited to, 1.0, 1.2 and 2.0 volts.

The bootstrap oscillator 456 is enabled when the $V_{BS}$ sense voltage at node 380 is sufficient for proper operation of the digital device 316 (as determined by the voltage sense comparator 464), the PWM enable is at a logic low and power-on-reset (POR) has been deasserted (at logic low). The bootstrap oscillator 456 may run at a fixed frequency, e.g., 400 to 800 kHz, free running when enabled, resistor-capacitor (RC) oscillator. The output from the bootstrap oscillator 456 may be divided by four (e.g., 100 to 200 kHz) with the divide by four frequency divider 470. The output from the divide by four frequency divider 470 passes through AND gate 444 to an input of the multiplexer 440. When the PWM enable is at a logic low, the multiplexer 440 couples the PWM signal from AND gate 444 to the PWM output node 382 which controls the transistor driver 114.

The flip-flop 446 will cause the AND gate 444 to cut off the PWM output if current levels exceed acceptable limits under start-up conditions. This current limit is monitored by the current sense comparator 448 which holds the flip-flop 446 in clear (Q-output at logic low) when the current limit for this start-up configuration is exceeded.

The bootstrap oscillator 456 continues to run, supplying a PWM control signal to the transistor driver 114 until the hold-off counter 454 "times out" and asserts a logic high at an input of the OR gate 452. The hold-off counter 454 counts until a sufficient number of PWM pulses are sent to the power generation circuits comprising the transistor driver 114, power FET 112 and inductor 302. Once the hold-off counter 454 counts up to the "time out," and the POR and "brown-out on reset" (BOR) signals are deasserted (logic low) the digital device 316 and any other power application circuits are enables and all circuits go into normal operation, e.g., the PWM enable is set to a logic high by the digital device 316, and the PWM generator 442 now controls operation of the transistor driver 114. During normal operation of the digital device 316 the bootstrap oscillator 456 is disabled by the output from the AND gate 458. It is contemplated and within the scope of this disclosure that other logic circuit designs may be equally effective and would be readily understood by one having ordinary skill in the design of digital circuits and the benefit of this disclosure.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A power system having a boot strap stimulator for startup thereof, said power system comprising:
 a power inductor having a power coil and an auxiliary coil;

a power transistor connected to the power coil, and the power coil and power transistor are connected to a direct current power source, wherein when the power transistor switches on and off a varying magnetic flux is created in the power inductor that causes alternating current voltages to be generated in the power coil and the auxiliary coil;

a transistor driver connected to and controlling the power transistor;

a digital device having an output connected to the transistor driver for control thereof;

a low dropout voltage regulator supplying power to the digital device;

a circuit configured to provide a low current bias voltage coupled to the direct current power source, the circuit configured to provide a low current bias voltage supplying a startup voltage to the low dropout voltage regulator and the transistor driver; and a power rectifier coupled to the auxiliary coil, wherein the power rectifier supplies an operating voltage to the low dropout voltage regulator and transistor driver;

wherein the output of the digital device supplies a first control signal at a constant frequency during startup of the power system and a pulse width modulated (PWM) second control signal independent from said first signal after startup, wherein the digital device determines a switching from the first control signal to the PWM second control signal.

2. The power system according to claim 1, wherein the digital device comprises:

a bootstrap voltage sensing circuit for sensing the startup voltage;

a bootstrap oscillator generating a signal at substantially a constant frequency when the bootstrap voltage sensing circuit determines that the startup voltage is above a certain voltage value;

a bootstrap counter having an input coupled to the bootstrap oscillator and counting the bootstrap oscillator signal to a predetermined value;

a PWM generator; and a multiplexer having a first input connected to the PWM generator, a second input coupled to the bootstrap oscillator, and an output supplying the control signal at the constant frequency while the bootstrap counter is counting to the predetermined value and the PWM control signal when the bootstrap counter has counted to the predetermined value.

3. The power system according to claim 2, further comprising a power-on-reset (POR) circuit for enabling the bootstrap oscillator when a POR signal is deasserted.

4. The power system according to claim 2, further comprising a current sensing circuit for determining current through the power transistor, wherein the current sensing circuit inhibits the bootstrap oscillator during startup if the current through the power transistor exceeds a predetermined value.

5. The power system according to claim 1, wherein the circuit configured to provide a low current bias voltage comprises:

a resistor;

a capacitor connected in series with the resistor, wherein the series connected resistor and capacitor are connected to the direct current power source; and a zener diode connected at a common connection of the resistor and the capacitor, wherein the startup voltage is supplied from the common connection.

6. The power system according to claim 2, wherein a system reset signal is deasserted when the bootstrap counter is at the predetermined value.

7. The power system according to claim 6, wherein the multiplexer is controlled by a PWM enable signal after the system reset signal is deasserted.

8. The power system according to claim 1, wherein the power transistor is a power field effect transistor (FET).

9. The power system according to claim 1, wherein the digital device is a microcontroller.

10. The power system according to claim 1, wherein the digital device is selected from the group consisting of a digital signal processor (DSP), an application specific integrated circuit (ASIC), a programmable logic array (PLA), and a field-programmable gate array (FPGA).

11. A power system having a boot strap stimulator for startup thereof, said power system comprising:

a power inductor having a power coil and an auxiliary coil having first and second output voltages, wherein the first output voltage is greater than the second output voltage;

a power transistor connected to the power coil, and the power coil and power transistor are connected to a direct current power source, wherein when the power transistor switches on and off a varying magnetic flux is created in the power inductor that causes alternating current voltages to be generated in the power coil and the tapped auxiliary coil;

a transistor driver connected to and controlling the power transistor;

a digital device having an output connected to the transistor driver for control thereof;

a low dropout voltage regulator supplying power to the digital device;

a circuit configured to provide a low current bias voltage coupled to the direct current power source, the circuit configured to provide a low current bias voltage supplying a startup voltage to the low dropout voltage regulator and the transistor driver; and a first power rectifier connected to the auxiliary coil first voltage, wherein the first power rectifier supplies a first operating voltage to the transistor driver; and a second power rectifier connected to the auxiliary coil second voltage, wherein the second power rectifier supplies a second operating voltage to the low dropout voltage regulator;

wherein the output of the digital device supplies a first control signal at a constant frequency during startup of the power system and a pulse width modulated (PWM) second control signal independent from said first signal after startup, wherein the digital device determines a switching from the first control signal to the PWM second control signal.

12. The power system according to claim 11, wherein the digital device comprises:

a bootstrap voltage sensing circuit for sensing the startup voltage;

a bootstrap oscillator generating a signal at substantially a constant frequency when the bootstrap voltage sensing circuit determines that the startup voltage is above a certain voltage value;

a hold-off counter having an input coupled to the bootstrap oscillator and counting the bootstrap oscillator signal to a predetermined value;

a PWM generator; and a multiplexer having a first input connected to the PWM generator, a second input coupled to the bootstrap oscillator, and an output supplying the control signal at the constant frequency while the hold-off counter is counting to the predetermined value and the PWM control signal when the hold-off counter has counted to the predetermined value.

13. The power system according to claim 12, further comprising a power-on-reset (POR) circuit for enabling the hold-off oscillator when a POR signal is deasserted.

14. The power system according to claim 12, further comprising a current sensing circuit for determining current through the power transistor, wherein the current sensing circuit inhibits the bootstrap oscillator during startup if the current through the power transistor exceeds a predetermined value.

15. The power system according to claim 11, wherein the circuit configured to provide a low current bias voltage comprises:
   a resistor;
   a capacitor connected in series with the resistor, wherein the series connected resistor and capacitor are connected to the direct current power source; and
   a zener diode connected at a common connection of the resistor and the capacitor, wherein the startup voltage is supplied from the common connection.

16. The power system according to claim 12, wherein a system enable signal is asserted when the hold-off counter is at the predetermined value.

17. The power system according to claim 16, wherein the multiplexer is controlled by a PWM enable signal after the system enable signal is asserted.

18. The power system according to claim 11, wherein the power transistor is a power field effect transistor (FET).

19. The power system according to claim 11, wherein the digital device is a microcontroller.

20. The power system according to claim 11, wherein the digital device is selected from the group consisting of a digital signal processor (DSP), an application specific integrated circuit (ASIC), a programmable logic array (PLA), and a field-programmable gate array (FPGA).

21. The power system according to claim 12, further comprising a divide-by-four counter connected between the bootstrap oscillator and the hold-off counter.

22. A method for operating a power system having a boot strap stimulator for startup thereof, the system comprising:
   a power inductor having a power coil and an auxiliary coil;
   a power transistor connected to the power coil, and the power coil and power transistor are connected to a direct current power source, wherein when the power transistor switches on and off a varying magnetic flux is created in the power inductor that causes alternating current voltages to be generated in the power coil and the auxiliary coil;
   a transistor driver connected to and controlling the power transistor;
   a digital device having an output connected to the transistor driver for control thereof;
   a low dropout voltage regulator supplying power to the digital device;
   a circuit configured to provide a low current bias voltage coupled to the direct current power source; and
   a power rectifier coupled to the auxiliary coil;
   the method comprising:
   providing a power supply voltage by said direct current power source;
   generating a first supply voltage by said circuit configured to provide a low current bias voltage for said low dropout voltage regulator;
   providing a first control signal at a constant frequency by said digital device to said transistor driver;
   generating a second supply voltage by said auxiliary coil for said low dropout voltage regulator; and
   after a predetermined time switching from said first control signal to a pulse width modulated second control signal independent from said first signal by said digital device.

23. The method according to claim 22, wherein the first control signal is generated by the digital device once a sufficient supply voltage is provided by said startup power circuit.

* * * * *